US005577687A

United States Patent [19]
Downing

[11] Patent Number: 5,577,687
[45] Date of Patent: Nov. 26, 1996

[54] PORTABLE HELICOPTER LANDING PAD

[76] Inventor: James R. Downing, 10218 Donna Ave., Northridge, Calif. 91324

[21] Appl. No.: 517,067

[22] Filed: Aug. 21, 1995

[51] Int. Cl.$^6$ .............................. B64D 1/08; B64F 1/36; B64F 1/00
[52] U.S. Cl. ................................ 244/110 E; 244/114 R; 244/137.1; 244/137.4
[58] Field of Search .............................. 244/115, 114 R, 244/110 F, 137.1, 137.4, 138 R, 17.17

[56] References Cited

U.S. PATENT DOCUMENTS

| | | | |
|---|---|---|---|
| 3,172,508 | 3/1965 | Doering et al. | 244/114 R |
| 3,351,325 | 11/1967 | Cotton | 244/137.1 |
| 3,433,441 | 3/1969 | Cummings | 244/138 R |
| 3,649,724 | 3/1972 | Rembert et al. | 244/114 R |
| 5,067,669 | 11/1991 | Van Horn et al. | 244/114 R |
| 5,273,239 | 12/1993 | De Parny et al. | 244/137.1 |
| 5,344,203 | 9/1994 | Tollenaere | 244/137.1 |

FOREIGN PATENT DOCUMENTS

| 0508092 | 9/1977 | U.S.S.R. | 244/110 E |
|---|---|---|---|

*Primary Examiner*—Andres Kashnikow
*Assistant Examiner*—Virna Lissi Mojica
*Attorney, Agent, or Firm*—Robert Louis Finkel

[57] ABSTRACT

A portable helicopter landing pad especially suitable for deployment on an unprepared surface comprises a number of perforated metal mats which on being joined at their edges define a heliport of predetermined size and shape. Dual-purpose connectors releasably join adjacent mats to one another and anchor the edges of the mats to the underlying surface. If needed, moveable stiffening plates are provided for strengthening the assembled mats where the wheels or skids of the helicopter touch down. A rigid container is provided for transporting and storing the predetermined number of mats, connectors, and tools needed for a particular heliport. For larger installations, several containers are pre-packed to facilitate the transport and assembly of the required components. The container is designed to prevent the stacked mats, connectors, and tools from shifting while in transit. A removable cover retains the container's contents and further prevents them from slipping during storage and transport.

8 Claims, 3 Drawing Sheets

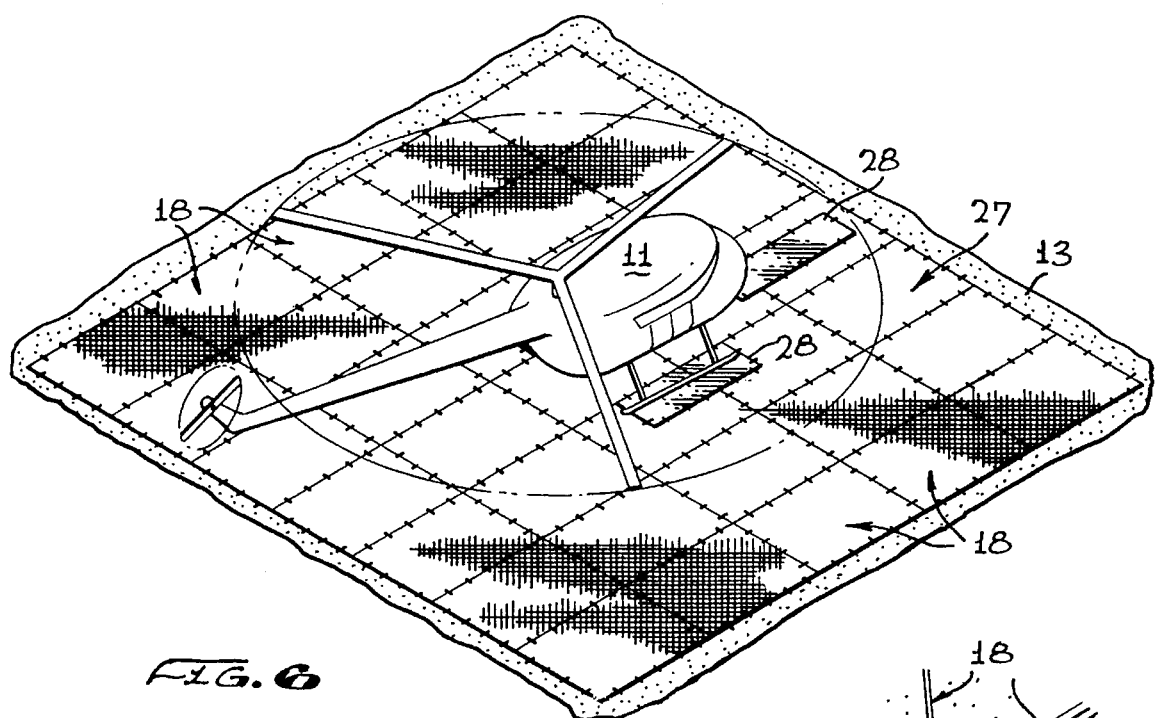
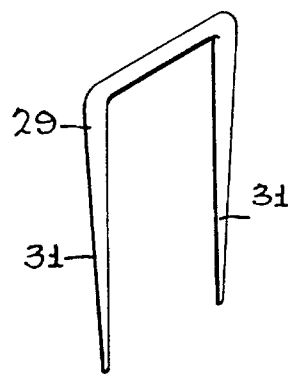
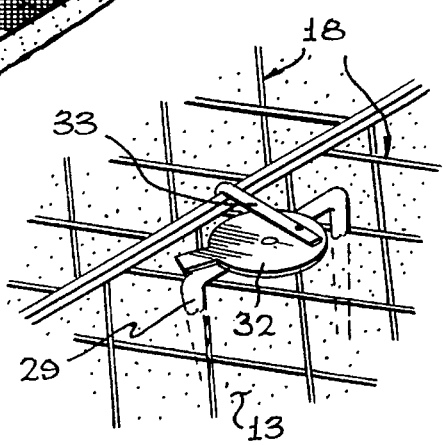
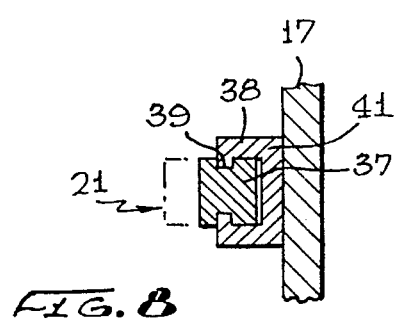
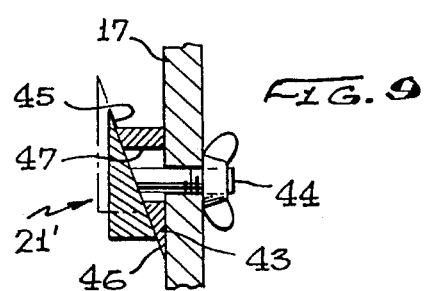

PORTABLE HELICOPTER LANDING PAD

BACKGROUND OF THE INVENTION

1. Field of the Invention

This invention relates to assembleable landing pads for helicopters, and more particularly to such pads which are adapted to be packed up and transported from a storage or installation site for deployment at another location.

2. Prior Art

Many helicopter applications, for example, agricultural, cargo and passenger transportation, construction, fire control, forestry, law enforcement, military, power and pipe line patrol, and search and rescue operations, necessitate flying to and from unimproved off-airport locations. Some of these missions call for, or would be facilitated by, establishing a prepared landing site. In some instances, merely providing a relatively level clearing is sufficient. In others, particularly where the ground itself is muddy, or covered with loose debris, or otherwise unsuitable, or where the same site is to be used repeatedly, a portable landing pad which can be transported to the remote location by helicopter, truck, or boat and set up as a temporary, semi-permanent, or permanent helicopter landing pad or "heliport" would be invaluable. This invention is intended to provide such a landing pad.

I am not aware of any existing device or system which will serve this purpose. While the use of wire mesh, perforated, and expanded metal sheets as parking ramp, taxiway and runway ground cover for fixed and rotary wing aircraft is well known, the weight and size of such sheets makes storing quantities of them in readiness for use awkward and transporting and maneuvering stacks or rolls of them by helicopter difficult and dangerous. Additionally, conventional practice is either to connect adjacent sheets using whatever materials or hardware are available, or to retain them in place by means of stakes driven into the ground. Neither of these methods is suitable for heliport use, and no hardware exists that I am aware of which serves to both connect and anchor such sheets of ground covering material.

OBJECTS OF THE INVENTION

Viewed against this prior art background, one object of the subject invention is to provide a prefabricated, portable heliport having a sturdy, firm, smooth landing area that is free of obstructions and loose debris and that minimizes the amount of flying debris thrown up by the down wash of the helicopter rotors and exhaust.

Another object is to provide a prefabricated portable heliport ground cover which can be transported to a remote, undeveloped location and readily assembled under adverse conditions without need for special equipment, unconventional tools, or skilled personnel.

Still another object is to provide a method and means for prefabricating heliports of various sizes and shapes utilizing standardized, interchangeable, easily transportable components.

An additional object is to provide improved hardware for connecting and anchoring the assemblage of interchangeable pieces to form a heliport of the required size and shape.

A still further object is to provide an assembleable heliport which is light enough to be transported by helicopter, strong enough to support the helicopter, and suitable for the movement of materials and personnel to and from the helicopter. Moveable stiffeners should be provided for fortifying the regions of the assembled pad in which the load of the helicopter wheels or skids is concentrated.

A related object is to provide a container for storing and transporting the predetermined inventory of assembleable pieces, connecting and anchoring hardware, and tools needed to fabricate a heliport of the desired size and shape. The container must be sturdy enough to resist damage to itself and its contents in heavy use, yet light enough, with its contents, to be transported by helicopter, wheeled vehicle, or watercraft.

Other objects will become apparent from the following summary of the invention and detailed description of its preferred embodiment as presently envisioned.

SUMMARY OF THE INVENTION

My invention comprises a plurality of substantially identical open mesh metal or plastic mats adapted, when connected to one another and anchored to the ground, to define a clean, smooth, sturdy, durable, rigidly fixed helicopter-supporting pad and protective ground cover. Novel reusable hardware serves to both connect adjacent pairs of mats and anchor the mats to the underlying surface. Moveable stiffening plates furnished with the mats are adapted to be positioned on the pad to provide additional support for the helicopter wheels or skids.

A sturdy, rigid container is sized and configured to hold the predetermined number of mats, pieces of hardware, and fabrication tools needed to assemble the heliport. The container is designed to receive the mats in a stack and to prevent them and the rest of the contents from shifting during flight. A rigid, releasably mounted cover serves to retain the mats and the other contents of the container in spaces provided for them.

Clevises secured to the container frame serve as attachment points for a conventional cargo harness, such as those used by helicopters, ground vehicles, and water craft.

For a fuller understanding of the invention, its operation, and its advantages, reference is made to the following detailed description of the preferred embodiment illustrated in the accompanying drawings.

BRIEF DESCRIPTION OF THE DRAWINGS

In the drawings:

FIG. 5 is a top perspective view of a helicopter at rest on a landing pad embodying the subject invention;

FIG. 6 is a top perspective view of a connector in accordance with the subject invention;

FIG. 7 is a top perspective view of an alternative connector in accordance with the subject invention;

FIG. 8 is a fragmentary top sectional view of a replaceable spacer mounted to the inside of a wall of a container in accordance with the subject invention; and FIG. 9 is a fragmentary side elevation of an adjustable spacer mounted to the inside of a wall of a container in accordance with the subject invention.

Wherever practicable, the same numeral is used to identify identical or substantially similar features appearing in the several figures.

DETAILED DESCRIPTION OF THE PREFERRED EMBODIMENTS

Figure 1:
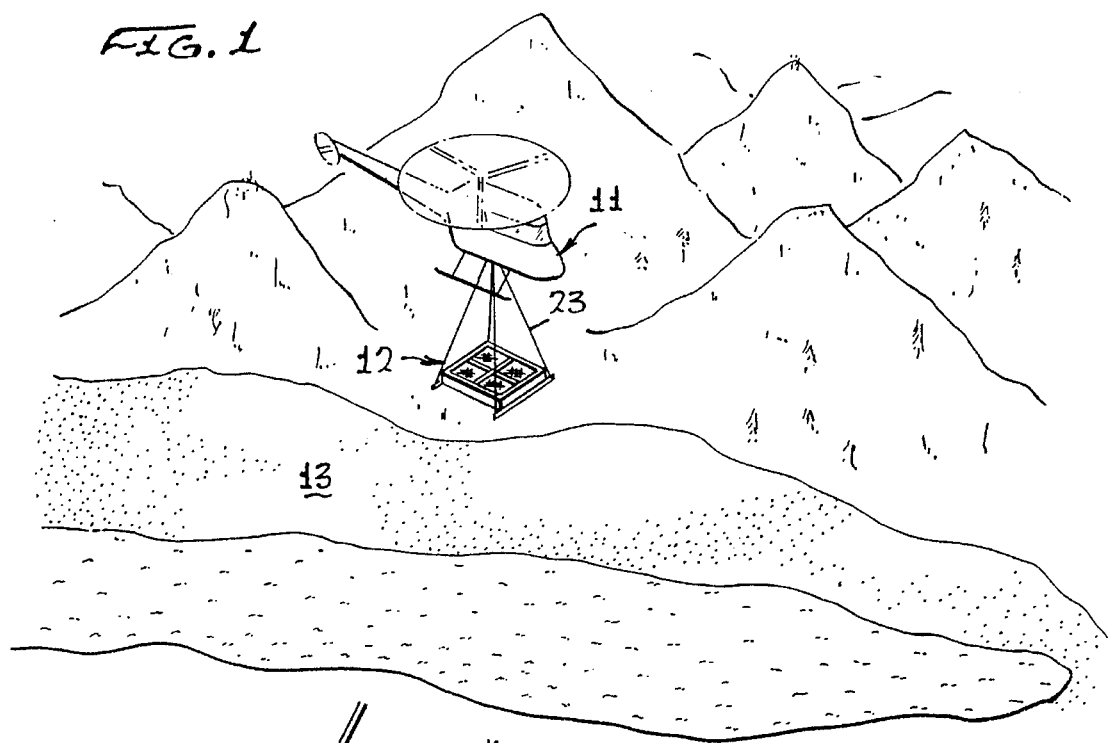
FIG. 1 is a panoramic view of a fanciful typical off-airport location for a remote helicopter landing site.

FIG. 1 illustrates a typical application for my portable landing pad. In many regions, remote and inaccessible mountainous terrain covered with combustible trees or chaparral poses a threat of dangerous, costly fires during the dry summer months. Experience has demonstrated that, caught early, such fires generally can be knocked down quickly and easily by fire retardant-dropping helicopters. The most cost-effective way to utilize available aircraft and human resources and minimize response time in such conditions is to establish and maintain unmanned semi-permanent bases at key locations where the fire hazard is the greatest. The helicopter 11 in FIG. 1 is carrying a container 12 holding a complete helicopter landing pad ready for assembly on a narrow strip of soft or muddy shoreline 13 next to an isolated mountain lake. Dropped from the same helicopter, a crew of three or four will easily have the heliport operational in less than an hour.

Figure 2:
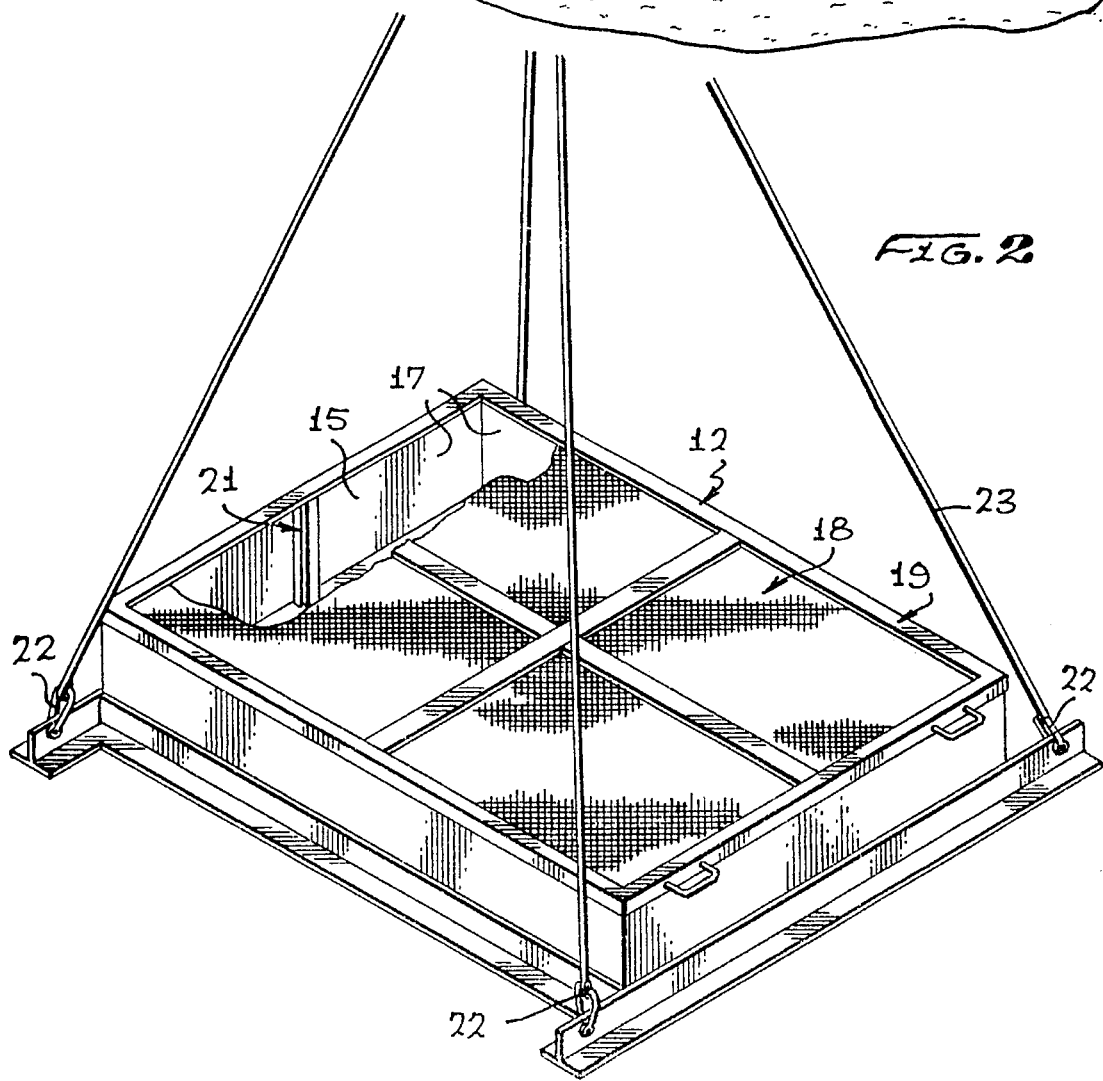
FIG. 2 is a top perspective view of a covered container in accordance with the subject invention, with portions cut away to show its contents.
Figure 3:
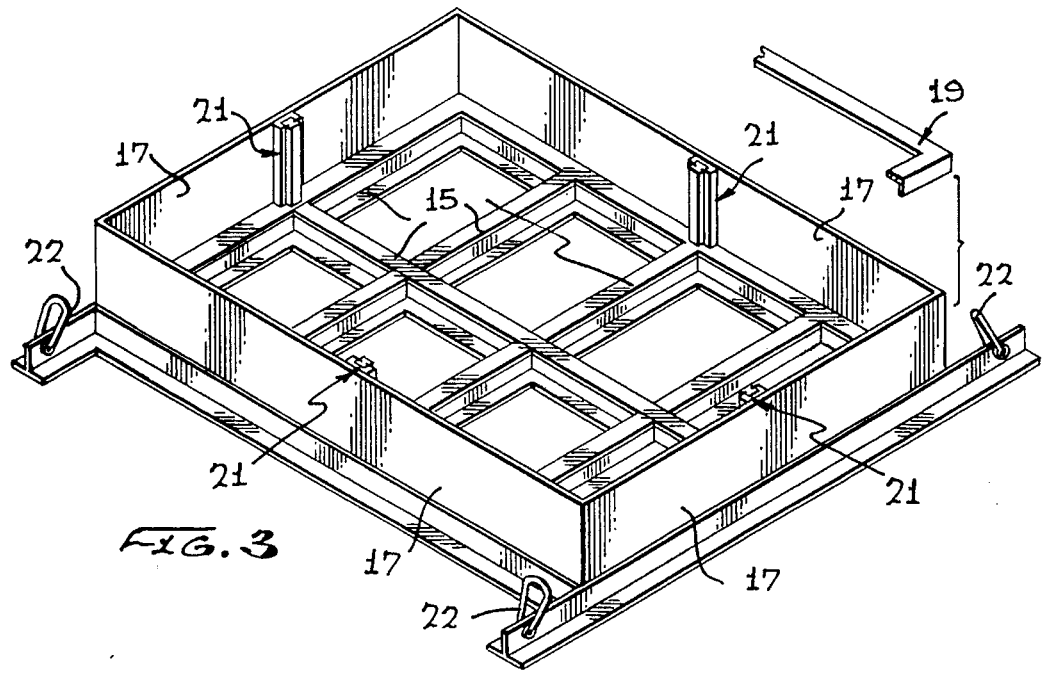
FIG. 3 is an enlarged, fragmentary top perspective view of the container of FIG. 2 with its contents removed and portions cut away to show its construction.

Every effort is made to minimize the weight of the pad components and the container without jeopardizing their strength and durability. In the preferred embodiment seen in FIGS. 2 and 3, this is achieved in part by utilizing a sturdy open framework 15 of welded steel I-beams 16 as the bottom of the container 12. The planar upper surface of framework 15 serves as the container's floor.

The framework 15 rigidly supports four upstanding walls 17 which are spaced to retain a variable number of mats 18 stacked on the floor. The fit is loose enough to allow individual mats 18 to be removed readily by unskilled workmen using cargo hooks or the like, but close enough for the walls 17 to prevent the stacked mats 18 from moving sufficiently to unbalance the load. A removable cover 19 conveniently formed of welded angle stock and cross braces is sized to slip over the walls 17 and hold down the mats 18. If desired, the cover 19 can be attached to one of the walls 17 by conventional hinges (not shown) and secured to the opposite wall by means of hasps or other common closures (likewise not shown). This arrangement allows the cover to be rotated out of the way for access to the container's contents.

To minimize slippage of the container's contents and resultant potentially hazardous cargo imbalance, if desired, replaceable or adjustable spacers 21 (such as those exemplified in FIGS. 8 and 9, respectively) can be positioned at intervals around the insides of the walls 17 to compensate for variations in the length and width of mats 18. Similarly, replaceable or adjustable spacers (not shown) can be provided on the underside of cover 19 to apply restraining force downwardly on the contents of container 12.

It will be appreciated that the layout of container 12, and indeed, its form, the materials of which it is made, and its method of construction, are matters of choice. By way of example, instead of a framework 15, walls 17, and cover 19 of steel, the floor, walls, and cover can be fabricated of sheet or lattice made of high-strength plastic or carbon fiber material, or any one of a number of other well known synthetics using well known bonding techniques.

To facilitate handling of the container 12, clevises 22 are provided at the corners of framework 15. A cargo sling 23 attached to the clevises 22 allows the container and its contents to be transported by helicopter or winched onto a flatbed truck or a vessel for transport by land or water.

Figure 4:
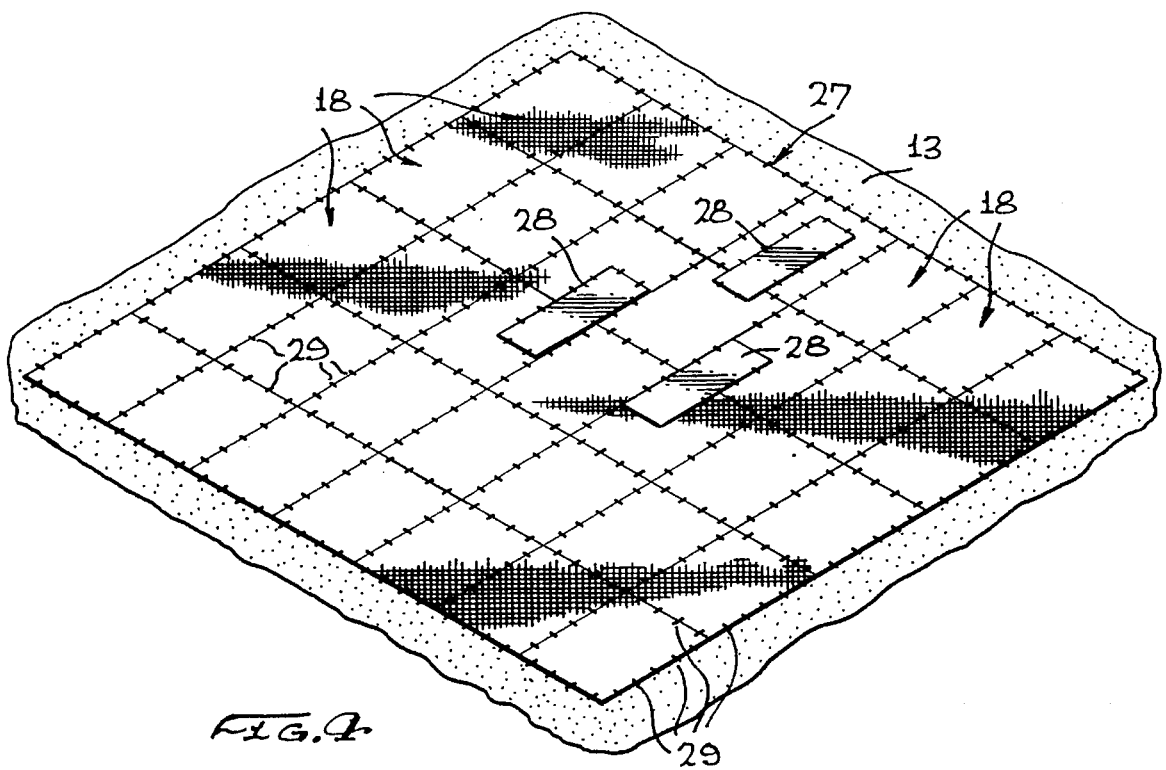
FIG. 4 is a top perspective view of an assembled helicopter landing pad in accordance with the subject invention.

Referring to FIGS. 4 and 5, the landing pad 27 is formed by assembling and connecting a predetermined number of the mats 18. As a general proposition, conventional wisdom suggests that a helicopter landing pad should be roughly equal in size to the diameter of the main rotor or rotors of the largest helicopter using it. By way of example, the landing pad for a typical medium-sized helicopter, such as the Bell 206 which has a rotor diameter of approximately 40 feet, should be about 40 feet square. Although the mats 18 can be of any desired configuration and size, for convenience I prefer to make them rectangular and 6 feet wide and 8 feet long. For the Bell 206, the pad 27 would best be formed with 35 of the mats 18 arranged lengthwise in 7 columns each containing 5 mats. The width of the pad would be 42 feet, its length 40 feet. For a larger helicopter, the pad might contain 70 mats arranged in 10 columns (60 by 56 feet), and for a still larger one, the arrangement might utilize 88 mats in 11 columns (66 by 64 feet).

The mats 18 can be of any suitable metal or other natural or synthetic material. My preference is for a relatively fine open mesh of expanded galvanized steel or other corrosion resistant metal, the idea being to make the mats 18 as light as possible while providing adequate support for the helicopter, personnel, and cargo. Typically, a kit, that is, a container with all of the ground covering mats, connecting/anchoring hardware, and tools, such as cargo hooks and hammers, needed for deploying a 40 foot-square landing pad weighs approximately 4,500 pounds. This is well within the lifting capacity of the average modern medium size helicopter. In special situations warranting the additional cost, a reduction in weight by as much as sixty percent could be achieved by using aluminum in place of steel for the mats and container. For operations on some surfaces, a much lighter ground cover, such as woven galvanized wire or suitable widely-perforated sheeting, can be substituted for the heavier expanded steel sheets required where the surface is soft or muddy, or where the ground is covered with sand, small stones, or other finely-divided debris. Where the nature of the terrain and the condition of the ground surface permit, great savings in weight can be effected by using a lighter, more resilient ground covering material and positioning rigid reinforcing plates 28 at the helicopter wheel or skid touchdown points.

To connect and anchor the mats 18 and anchor reinforcing plates 28, I prefer to use an inverted "U"-shape connector 29 such as that shown in FIG. 6. Each piece of this hardware serves to join adjacent pairs of mats 18 and at the same time to anchor the joined mats 18 to the ground. The spacing and length of legs 31 are determined primarily by the nature and dimensions of the material of which the mats 18 are made and the character of the underlying ground surface, the principal requirement being that the connector 29 straddle the adjacent edges of adjoining pairs of mats 18. Driven into the underlying ground by means of a light sledge hammer, the legs 18 to one another, and to the ground. When the time comes for dismantling the landing pad, all that is necessary is to pull the legs of the connectors 29 out of the ground. This is easily accomplished using a lever or pinch bar included among the tools transported in the container. Removing the connectors 29 releases the joined mats 18 and allows them to be returned to their container 12 for transport to another installation or storage site.

Various other styles of connector can be adapted to the mat material and the conditions anticipated at the landing site. For example, the alternative embodiment of the connector 29 illustrated in FIG. 7 offers certain advantages over the staple-like version of FIG. 6. The principal one of these is the provision, in the form of lever-operated cam 32, of a mechanism for manually controlling the tension applied by hook 33 to draw the adjacent mats 18 together. This feature allows one person to make small adjustments in the position of the mats 18 without the help of a another.

FIGS. 8 and 9 illustrate two types of spacers which can be employed to minimize the slippage of the mats 18 within container 12 and the possibility of a potentially dangerous imbalance of the cargo, especially during transport by helicopter. The spacer of FIG. 8 is an elongated first block 37 of steel, wood, or another suitable material of predetermined thickness slidingly mounted to a bracket 38 positioned on the inner side of the container wall 17 by means of longitudinal grooves 39 formed in the edges of block 37. To compensate for variations in the dimensions of mats 18, a similarly constructed second block 41 of appropriate thickness is substituted for first block 37.

In the alternative embodiment shown in FIG. 9, the spacer 21' in this instance a block 43 of steel, wood, or another suitable material is mounted to the inside of wall 17 by means, such as a bolt 44 passing through vertical slots 47 in a pair of opposed wedges 45, 46. Relative vertical motion of wedges 45, 46 moves block 43 inwardly and outwardly of wall 17 to compensate for variations in the length and width of mats 18. It will be understood that other methods and means can be used in place of the embodiments of FIGS. 8 and 9.

In the illustrated embodiment of the invention, I have described constructions in which the assembled landing pad is rectangular. It should be understood, however, that such need not be the case. If desired, the mats 18 can be used to create a heliport of virtually any configuration. It is possible, for example, to lay out mats 18 to form a circular, or a triangular pad, or one of free form, to meet the needs of a particular mission, or to conform to the terrain or to air traffic requirements.

Typically, I would expect a user of my invention to assemble and store one or more kits containing the quantity of mats, hardware, and tools needed to construct a heliport of predetermined size and configuration for each helicopter intended to be used. For installations at multiple sites, or for larger helipads, two or more such kits would be transported to the deployment site. Where this procedure would cause unnecessary duplication, or waste, it may be more practical for the operator merely to wait for the requirement for remote deployment to arise, and then select a container sized for the quantities of mats, hardware, and tools needed and prepare a kit conforming to those precise needs.

The utility and advantages afforded by my invention will be readily apparent from the foregoing description. It should be understood, however, that although the invention has been described in terms of the specific constructions shown in the drawings, it is not to be construed as limited to those embodiments. They are to be regarded as illustrative rather than restrictive. This specification is intended to encompass any and all variations of the examples chosen for purposes of the disclosure, which do not depart from the spirit and scope of the invention as it is defined by each and all of the following claims.

What is claimed is:

1. A portable helicopter landing pad for deployment on a surface, comprising:

a plurality of perforated mats of generally uniform size and shape, said mats on being joined at their edges defining a helicopter landing pad of predetermined size and shape;

a plurality of connectors each adapted for releasably joining adjacent pairs of said mats to one another and releasably anchoring the joined mats to an underlying surface; and a container for storing and transporting a stack of said mats, said container including a rigid bottom defining a floor for supporting the stacked mats, upstanding walls rigidly mounted to the bottom effectively surrounding the stacked mats and preventing them from shifting during storage and transport, and a removable cover mounted to the walls for retaining the stacked mats in said container during storage and transport.

2. A portable helicopter landing pad for deployment on a surface, comprising:

a plurality of mats of generally uniform size and shape, said mats on being joined at their edges defining a helicopter landing pad of predetermined size and shape;

a plurality of connectors each adapted for releasably joining adjacent pairs of said mats to one another and releasably anchoring the joined mats to an underlying surface; and a container for storing and transporting a stack of said mats, said container including a rigid bottom defining a floor for supporting the stacked mats, upstanding walls rigidly mounted to the bottom effectively surrounding the stacked mats and having replaceable spacers mounted to their confronting sides for abutment with said stacked mats, said spacers preventing said mats from shifting during storage and transport, and a removable cover mounted to the walls for retaining the stacked mats in said container during storage and transport.

3. A container for storing and transporting a stack of mats of generally uniform size and shape, said mats on being joined at their edges defining a helicopter landing pad of predetermined size and shape, a plurality of connectors each adapted for releasably joining adjacent pairs of said mats to one another and releasably anchoring the joined mats to an underlying surface, and tools for assembling and disassembling the mats, said container comprising:

a rigid bottom defining a floor for supporting the stacked mats, upstanding walls rigidly mounted to the bottom effectively surrounding the stacked mats and having replaceable spacers mounted to their confronting sides for abutment with said stacked mats, said spacers preventing said mats from shifting during storage and transport, and a removable cover mounted to the walls for retaining the stacked mats in said container during storage and transport.

4. A method for installing a ground-covering helicopter landing pad at an installation site, comprising:

providing a plurality of perforated mats of generally uniform size and shape, said mats on being joined at their edges defining a helicopter landing pad of predetermined size and shape;

providing a plurality of connectors each adapted for releasably joining adjacent pairs of said mats to one another and releasably anchoring the joined mats to an underlying surface;

providing a container having a rigid bottom defining a floor for supporting a plurality of stacked mats, upstanding walls rigidly mounted to the bottom for effectively surrounding a stack of mats supported on the floor of said container and preventing them from shifting during storage and transport, and a removable cover mounted to the walls for retaining the stacked mats in said container during storage and transport;

stacking said plurality of mats on the floor of said container;

transporting said container, together with said mats and said connectors, to an installation site;

removing said mats from said container;

deploying said mats on the ground at the site; and connecting adjacent pairs of said mats to one another and anchoring the connected pairs of mats to the ground by means of said connectors.

5. A portable helicopter landing pad in accordance with claim 2, wherein said spacers are adjustable.

6. A portable helicopter landing pad in accordance with claim 3, wherein said spacers are adjustable.

7. A method in accordance with claim 4, comprising transporting said container, together with said mats and said connectors, to an installation site by helicopter.

8. A portable helicopter landing pad in accordance with claims 2 and 3, wherein said mats are perforated.

* * * * *